United States Patent
Strickland et al.

(10) Patent No.: US 7,660,334 B1
(45) Date of Patent: Feb. 9, 2010

(54) SINGLE PRINTED CIRCUIT BOARD CONFIGURATION FOR A DATA STORAGE SYSTEM

(75) Inventors: Stephen E. Strickland, Marlborough, MA (US); John V. Burroughs, Mason, NH (US); Bassem N. Bishay, Attleboro, MA (US); Steven D. Sardella, Marlborough, MA (US)

(73) Assignee: EMC Corporation, Hopkinton, MA (US)

( * ) Notice: Subject to any disclaimer, the term of this patent is extended or adjusted under 35 U.S.C. 154(b) by 967 days.

(21) Appl. No.: 10/878,075

(22) Filed: Jun. 28, 2004

(51) Int. Cl.
*H04J 3/02* (2006.01)
(52) U.S. Cl. .................................................. 370/537
(58) Field of Classification Search .......... 370/532–541
See application file for complete search history.

(56) References Cited

U.S. PATENT DOCUMENTS

| | | | |
|---|---|---|---|
| 6,615,315 B1* | 9/2003 | Mulvey et al. | 711/114 |
| 2002/0083210 A1* | 6/2002 | Harrison et al. | 709/310 |
| 2003/0221061 A1* | 11/2003 | El-Batal et al. | 711/114 |
| 2004/0193791 A1* | 9/2004 | Felton et al. | 711/112 |
| 2004/0193926 A1* | 9/2004 | Vogman | 713/300 |
| 2008/0126631 A1* | 5/2008 | Bailey et al. | 710/74 |

* cited by examiner

*Primary Examiner*—Thai D Hoang
(74) *Attorney, Agent, or Firm*—Krishnendu Gupta; Scott A. Ouellette

(57) ABSTRACT

A data storage system includes a first storage processor for storing and retrieving data from a data storage array for at least one host computer; a second storage processor, coupled to the first storage processor by a communication link, for storing and retrieving data from the data storage array for the at least one host computer; a number M of multiplexers, M being greater than one, each of the multiplexers being coupled to the first storage processor and the second storage processor for receiving data signals from the first storage processor and the second storage processor and transmitting the data signals to a disk drive device; a number A of arbiters, each being coupled to the first storage processor, the second storage processor and a number N of the plurality of multiplexers, for receiving arbiter control signals from the first storage processor and the second storage processor and transmitting multiplexer control signals to each of the number N of the plurality of multiplexers; and a midplane device coupled between the plurality of multiplexers and the data storage array for transferring the data signals from the plurality of multiplexers to the data storage array. The first storage processor, the second storage processor, the plurality of multiplexers, the plurality of arbiters and the midplane are all mounted on a single printed circuit board.

12 Claims, 3 Drawing Sheets

SINGLE PRINTED CIRCUIT BOARD CONFIGURATION FOR A DATA STORAGE SYSTEM

FIELD OF THE INVENTION

The present invention is directed generally to a single printed circuit board configuration for a data storage system, and more particularly to a data storage system having its storage processors, data transmission devices and control signal devices mounted on a single printed circuit board.

SUMMARY OF THE INVENTION

Data storage systems can include two storage processors for handling the data processing operations of the storage system. The two storage processors enable the system to perform up to twice as much work in parallel than a single processor and one storage processor can take over the operation of the other storage processor should the other processor fail. Dual storage processor systems also include a number of multiplexers, each for transmitting data read and write instructions from both storage processors to a single disk drive of a disk drive array. A number of arbiters provide control signals to the multiplexers which determine which of the storage processors' read and write instructions will be transmitted to the disk drive at a particular time. A midplane provides the connection point between the multiplexers and the disk drive array.

In prior art data storage systems, each of the elements of the system is constructed on a different printed circuit board ("PCB"). In other words, each storage processor would be mounted on its own PCB and each multiplexer would be mounted on its own PCB, each having an arbiter mounted thereon. Furthermore, the midplane comprises a separate PCB. The existence of as many as 27 discrete PCBs, in the case of a 12 disk drive array, drastically increases the cost and complexity of the data storage system. For example, the design and development of the several printed circuit boards can be very expensive. The separate storage processor PCBs must be interconnected with expensive high-speed serial-based protocol chips and the routing of transmission lines between the storage processor PCBs and the multiplexer/arbiter PCBs can be complicated and also require expensive connectors. In this configuration, each board would require its own DC power connector for each power supply, thus complicating the power routing, and each board would require its own overcurrent protection circuit for each power supply branch that supplies power to the board.

SUMMARY OF THE INVENTION

The present invention is directed to a data storage system in which the storage processors, multiplexers, arbiters and midplane are all constructed on a single printed circuit board. The configuration enables the system to be less expensive to manufacture than prior art systems having multiple boards, simplifies the connections between the components on the board and reduces the power supply requirements for the system.

According to one embodiment, a data storage system includes a first storage processor for storing and retrieving data from a data storage array for at least one host computer; a second storage processor, coupled to the first storage processor by a communication link, for storing and retrieving data from the data storage array for the at least one host computer; a number M of multiplexers, M being greater than one, each of the multiplexers being coupled to the first storage processor and the second storage processor for receiving data signals from the first storage processor and the second storage processor and transmitting the data signals to a disk drive device; a number A of arbiters, each being coupled to the first storage processor, the second storage processor and a number N of the plurality of multiplexers, for receiving arbiter control signals from the first storage processor and the second storage processor and transmitting multiplexer control signals to each of the number N of the plurality of multiplexers; and a midplane device coupled between the plurality of multiplexers and the data storage array for transferring the data signals from the plurality of multiplexers to the data storage array. The first storage processor, the second storage processor, the plurality of multiplexers, the plurality of arbiters and the midplane are all mounted on a single printed circuit board.

The communication link between the first storage processor and the second storage processor may include a CMI path. The number N of multiplexers may equal the number A of arbiters divided by the number M of multiplexers. The data storage system may further include a number P of power supplies, wherein the data storage system includes a single power connector device mounted on the printed circuit board for each of the P power supplies. The data storage system may further include a power connector constructed on the single printed circuit board for receiving power from a power supply and a current protection device constructed on the single printed circuit board and being coupled to the power supply for providing at least one of overcurrent protection and reverse current protection for the data storage system.

According to another embodiment, a data storage system includes a single printed circuit board having mounted thereon: a first storage processor for storing and retrieving data from a data storage array for at least one host computer; a second storage processor, coupled to the first storage processor by a communication link, for storing and retrieving data from the data storage array for the at least one host computer; a number M of multiplexers, M being greater than one, each of the multiplexers being coupled to the first storage processor and the second storage processor for receiving data signals from the first storage processor and the second storage processor and transmitting the data signals to a disk drive device; a number A of arbiters, each being coupled to the first storage processor, the second storage processor and a number N of the plurality of multiplexers, for receiving arbiter control signals from the first storage processor and the second storage processor and transmitting multiplexer control signals to each of the number N of the plurality of multiplexers; and a midplane device coupled between the plurality of multiplexers and the data storage array for transferring the data signals from the plurality of multiplexers to the data storage array.

BRIEF DESCRIPTION OF THE DRAWINGS

These and other features of the invention will become more readily apparent from the following detailed description when read together with the accompanying drawings, in which.

DETAILED DESCRIPTION

Figure 1:
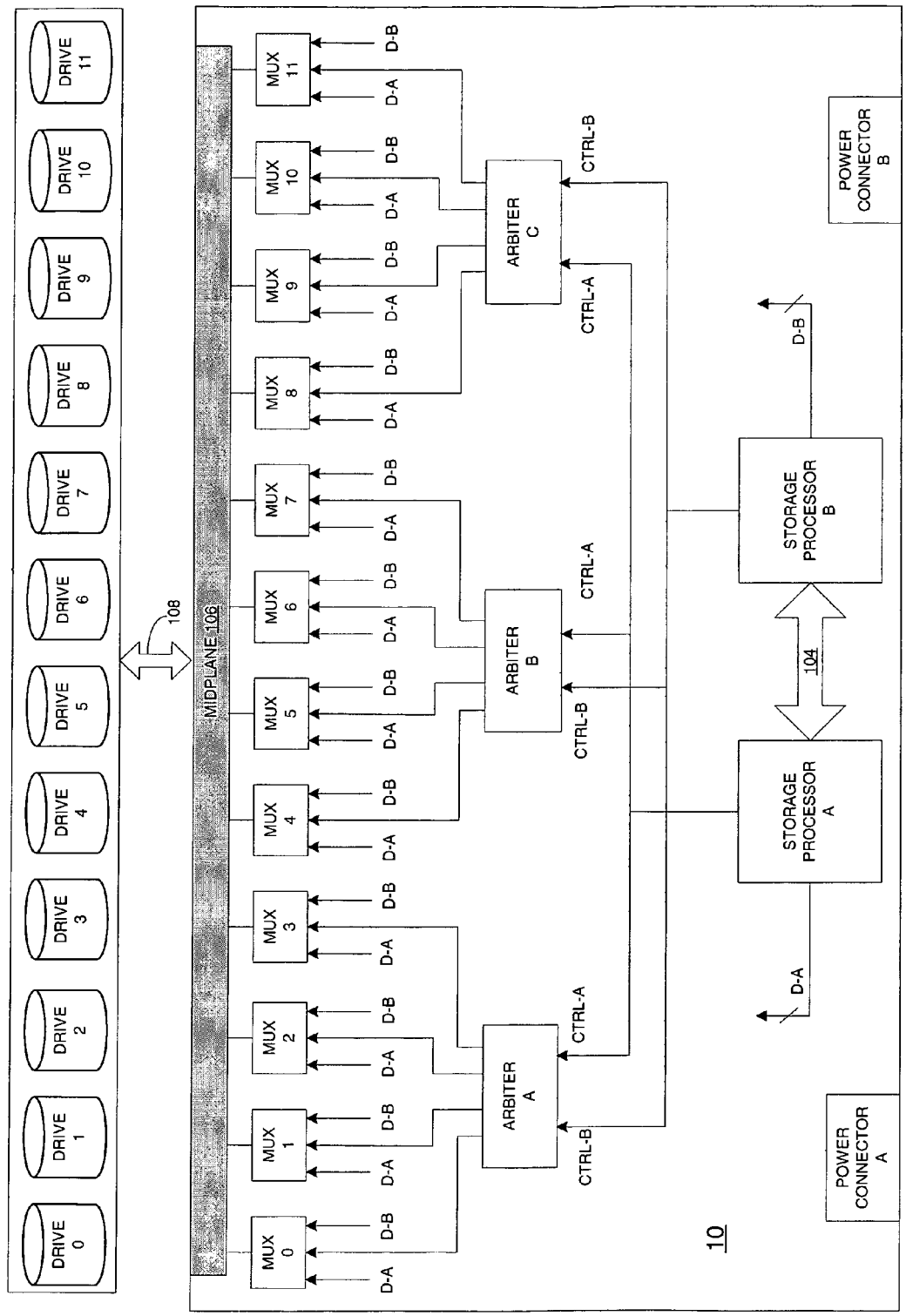
FIG. 1 is a schematic block diagram of the single printed circuit board configuration for a data storage system in accordance with the present invention.
Figure 2:
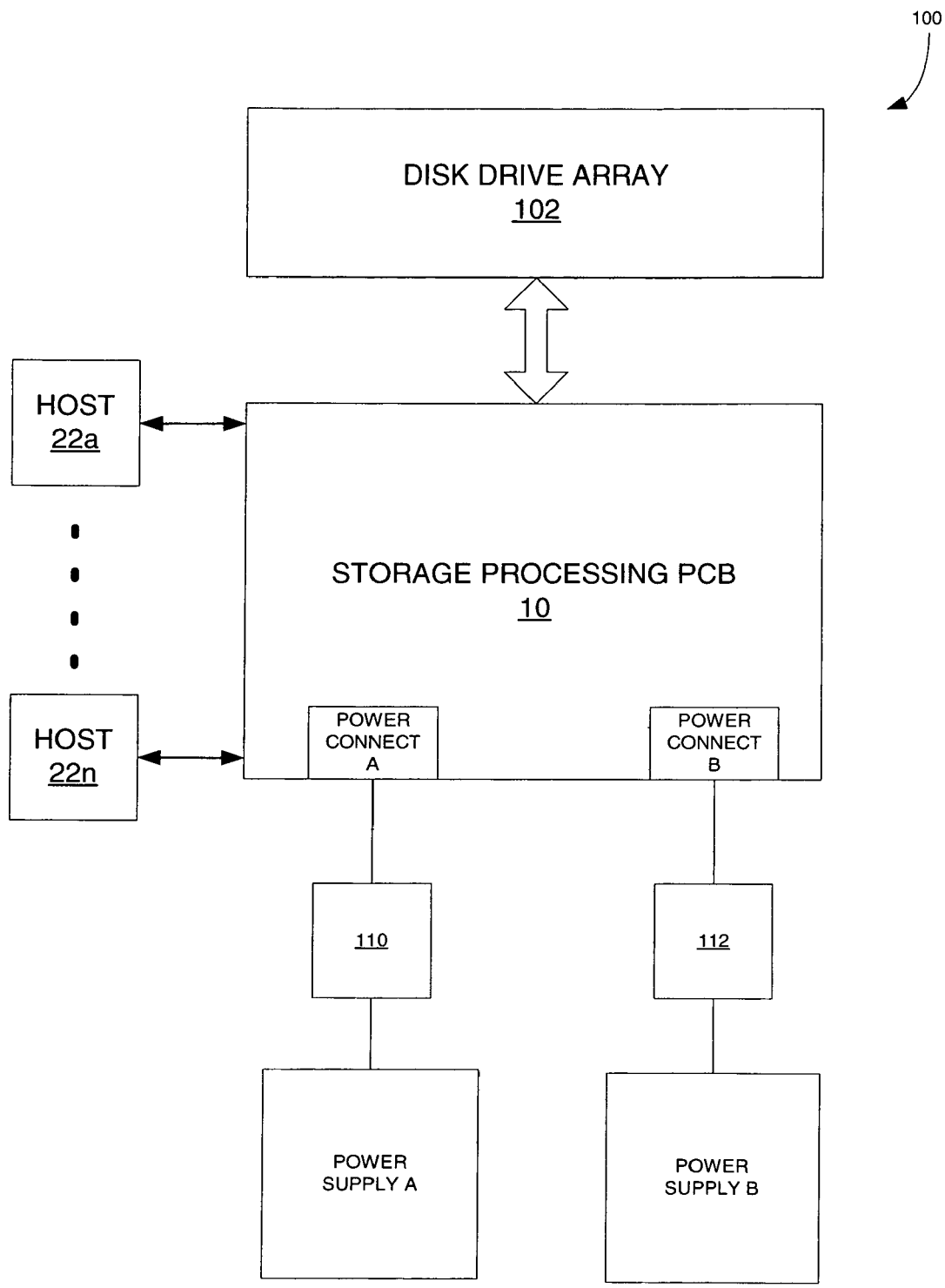
FIG. 2 is a schematic diagram of the data storage system including the single printed circuit board configuration in accordance with the present invention.
Figure 3:
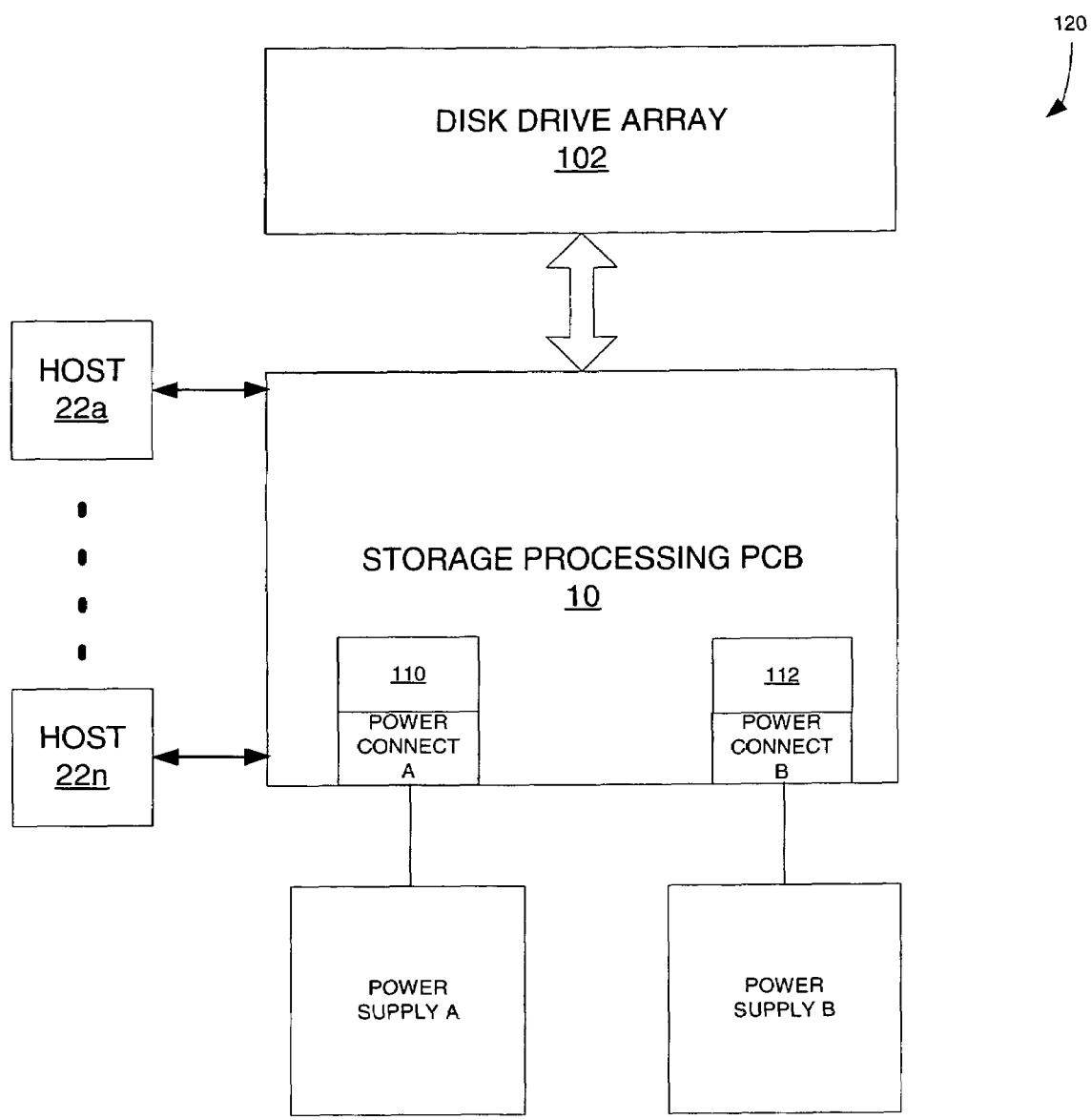
FIG. 3 is a schematic diagram of another embodiment of the data storage system including the single printed circuit board configuration in accordance with the present invention.

FIG. 1 is a schematic block diagram of the single printed circuit board 10 for a data storage system 100, FIG. 2, which performs a variety of data storage operations on behalf of hosts 22a-22n external to the system 100. System 100 includes Storage Processor A and Storage Processor B, which control the operation of the data storage system 100. Each of Storage Processors A and B is configured to perform data storage operations on behalf of one or more of the external hosts 22a-22n, and to perform such operations independently of and concurrently with data storage operations performed by the other storage processor. Accordingly, the data storage system 100 is well-suited for operating in an active-active manner in which the multiple storage processors perform data storage operations simultaneously in order to achieve greater throughput, i.e., a greater number of operations in a given amount of time than that provided by only one storage processor operating during that time.

Storage Processors A and B control read and write transfers to and from disk drives Drive 0 through Drive 11 of disk drive array 102. Disk drives Drive 0 through Drive 11 are preferably Serial ATA devices which are configured to store and retrieve data in a non-volatile manner. Each of Drives 0 through 11 receives data read and write transfers from each of Storage Processors A and B, labeled D-A and D-B, respectively, through a corresponding multiplexer, MUX 0 through MUX 11. For simplicity, the data lines between Storage Processor A and Storage Processor B and multiplexers MUX 0 through MUX 11 are not shown. Only the data outputs of Storage Processor A and Storage Processor B and the data inputs of multiplexers MUX 0 through MUX 11, as well as the communication link 104 between Storage Processor A and Storage Processor B are shown.

The outputs of multiplexers MUX 0 through MUX 11 are controlled by Arbiters A, B and C. Arbiters A, B and C are in turn controlled by control outputs CTRL-A and CTRL-B of Storage Processor A and Storage Processor B, respectively. In operation, Arbiters A, B and C determine which of the data read and write transfers D-A and D-B of each multiplexer MUX 0 through MUX 11 will be output to the corresponding disk drive Drive 0 through Drive 11, based on the control signals CTRL-A and CTRL-B received from Storage Processor A and Storage Processor B, respectively.

In one embodiment, each of Arbiters A, B and C control access to four of the disk drives Drive 0 through Drive 11 of the disk drive array 102. It will be understood, however, that fewer than three or more than three arbiters may be used to control access to an equal or unequal number of the drives Drive 0 through Drive 11 of the disk drive array 102

As shown in FIG. 1, Storage Processor A, Storage Processor B, multiplexers MUX0-MUX11 and Arbiters A-C are all constructed on the printed circuit board 10. Also constructed on the PCB 10 is a midplane 106, which connects the multiplexers MUX 0-11 to the drives DRIVE 0-11, respectively. Once the PCB 10 is mounted into a cabinet of the system 100 (not shown), the midplane 106 is connected to each of the drives DRIVE 0-11 through the use of cables, indicated by arrow 108.

Power Connectors A and B are each connected to independent Power Supplies A and B, respectively, as shown in FIG. 2. Power Connectors A and B are coupled to the components on the PCB 10 to supply power received from the Power Supplies A and B to each of the components on the PCB 10. Power Connectors A and B connect power to the components on the PCB in a redundant manner, such that, if one of the Power Supplies A and B fails, the other is able to supply power to the components of the PCB 10 to continue operation of the data storage system 100. While only one connection between each of Power Supplies A and B and the Power Connectors A and B is shown, it will be understood that multiple power supply branches may be connected between each power supply and its associated power connector, for the purpose of providing redundant power to the PCB 10.

The single PCB 10 also enables the data storage system 100 to require only one current protection device for each branch of each of Power Supplies A and B. As shown in FIG. 2, current protection device 110 is coupled between Power Supply A and Power Connector A and current protection device 112 is coupled between Power Supply B and Power Connector B. Current protection devices 110 and 112 operate to protect both the Power Supplies A and B and the components on the PCB 10 from reverse current and/or overcurrent conditions that may occur. Preferably, current protection devices 110 and 112 include overcurrent protection circuitry, as well as current ORing circuitry. The configuration and operation of such circuitry is known in the art and will not be described herein. While FIG. 2 shows the current protection devices 110 and 112 as being discrete components separate from the PCB 10, current protection devices 110 and 112 may be configured on the PCB 10 to be part of the Power Connectors A and B, respectively.

Having both Storage Processor A and Storage Processor B directly mounted to the PCB 10 enables the communication link 104 between Storage Processor A and Storage Processor B to be a lost-cost parallel Common Message Interface ("CMI") path, rather than the more expensive high-speed serial communication paths required in the prior art, to connect the separate boards on which each storage processor would be mounted. Furthermore, the routing of the control signals from the storage processors to the arbiters is implemented directly on the PCB 10, thus reducing the complexity and cost associated with the prior art method of connecting the separate storage processor boards with each of the discrete arbiters.

Accordingly, the present invention provides a data storage system which is configured at a lower cost and with less complexity than prior art systems. By constructing each of the storage processors, multiplexers, arbiters and the midplane on a single PCB, the cost of the system is reduced, because only one board design is required, rather than the 3 required in the prior art, and because it is less expensive to manufacture a single board with the required components than it is to manufacture the 3 different boards that are required in the prior art. Furthermore, the single PCB of the invention enables a less expensive parallel CMI path to be utilized for interconnecting the storage processors. Since the storage processors are constructed on the single PCB, the communication link between the midplane and the disk drives can be implemented with a standard cable configuration: The single PCB configuration also enables the reduction in the number of arbiters required for controlling the multiplexers. Rather than a 1:1 requirement for arbiters and multiplexers, in the present invention, single arbiters are configured to control multiple multiplexers. With the single PCB configuration, dual independent power supplies are utilized to generate a highly available power source for both the drives and the PCB components. Moreover, the single PCB configuration requires only one power connector on the board for each power supply, and requires only one current protection device for each power source branch that supplies power to the PCB.

The invention may be embodied in other specific forms without departing from the spirit or essential characteristics thereof. For example, while the system 100 is described as utilizing SATA disk drives, other arrangements, such as diskette drives, tapes drives, CD-ROM drives and combinations thereof may also be utilized in the system. Furthermore, different ratios of arbiters to multiplexers may also be utilized. It should be understood that the data storage system was described above as having two storage processors by way of example only. In other arrangements, the data storage system has more than two storage processors. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A data storage system comprising:
a first storage processor for storing and retrieving data from a data storage array for at least one host computer;
a second storage processor, coupled to the first storage processor by a communication link, for storing and retrieving data from the data storage array for the at least one host computer;
a number M of multiplexers, M being an integer greater than one, each of the multiplexers being coupled to the first storage processor and the second storage processor for receiving data signals from the first storage processor and the second storage processor and transmitting the data signals to a disk drive device of the data storage array;
an integer number A of arbiters, each being coupled to the first storage processor, the second storage processor and a number N of the plurality of multiplexers, for receiving arbiter control signals from the first storage processor and the second storage processor and transmitting multiplexer control signals to each of the number N of the plurality of multiplexers; and
a midplane device coupled between the plurality of multiplexers and the data storage array for transferring the data signals from the plurality of multiplexers to the data storage array;
wherein the first storage processor, the second storage processor, the plurality of multiplexers, the plurality of arbiters and the midplane are all constructed on a single printed circuit board.

2. The data storage system of claim 1 wherein the communication link between the first storage processor and the second storage processor comprises a Common Message Interface ("CMI") path.

3. The data storage system of claim 1 wherein the number N of multiplexers equals the number M of multiplexers divided by the number A of arbiters.

4. The data storage system of claim 1 further comprising an integer number P of power supplies, wherein the data storage system includes a single power connector device mounted on the printed circuit board for each of the P power supplies.

5. The data storage system of claim 1 further comprising a power connector constructed on the single printed circuit board for receiving power from a power supply.

6. The data storage system of claim 5 further comprising a current protection device constructed on the single printed circuit board and being coupled to the power supply for providing at least one of overcurrent protection and reverse current protection for the data storage system.

7. A data storage system comprising:
a single printed circuit board having mounted thereon:
a first storage processor for storing and retrieving data from a data storage array for at least one host computer;
a second storage processor, coupled to the first storage processor by a communication link, for storing and retrieving data from the data storage array for the at least one host computer;
a number M of multiplexers, M being an integer greater than one, each of the multiplexers being coupled to the first storage processor and the second storage processor for receiving data signals from the first storage processor and the second storage processor and transmitting the data signals to a disk drive device of the data storage array;
an integer number A of arbiters, each being coupled to the first storage processor, the second storage processor and a number N of the plurality of multiplexers, for receiving arbiter control signals from the first storage processor and the second storage processor and transmitting multiplexer control signals to each of the number N of the plurality of multiplexers; and
a midplane device coupled between the plurality of multiplexers and the data storage array for transferring the data signals from the plurality of multiplexers to the data storage array.

8. The data storage system of claim 1 wherein the communication link between the first storage processor and the second storage processor comprises a Common Message Interface ("CMI") path.

9. The data storage system of claim 7 wherein the number N of multiplexers equals the number M of multiplexers divided by the number A of arbiters.

10. The data storage system of claim 7 further comprising an integer number P of power supplies, wherein the data storage system includes a single power connector device mounted on the printed circuit board for each of the P power supplies.

11. The data storage system of claim 7 further comprising a power connector constructed on the single printed circuit board for receiving power from a power supply.

12. The data storage system of claim 11 further comprising a current protection device constructed on the single printed circuit board and being coupled to the power supply for providing at least one of overcurrent protection and reverse current protection for the data storage system.

* * * * *